Feb. 4, 1964
H. W. GOULD
3,120,394
JOINT SEAL FOR SPLIT PACKING
Filed Sept. 11, 1961
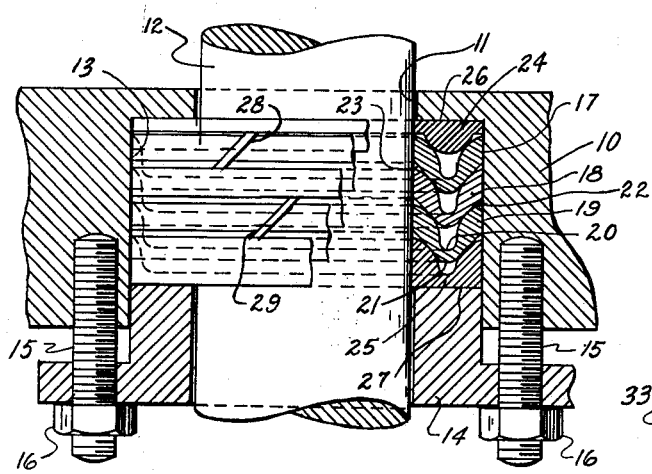
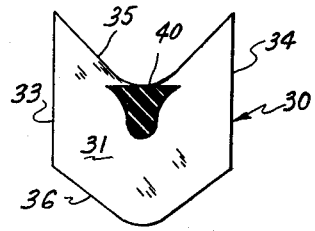
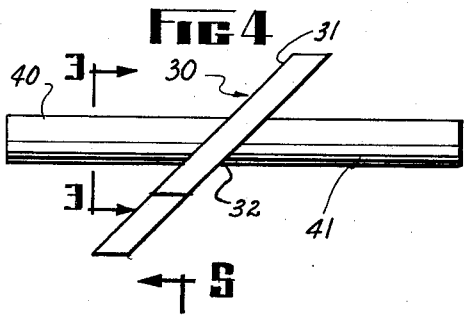
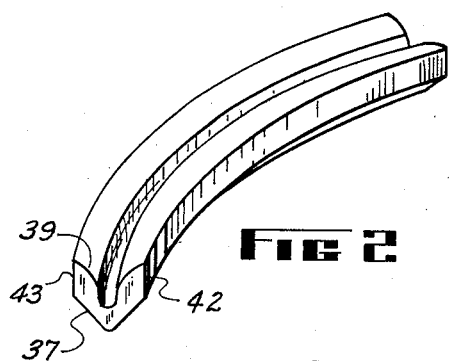
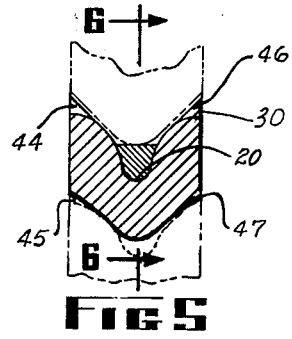
INVENTOR.
Harold W. Gould
BY
Charles J. Vajtech
ATT'Y.

United States Patent Office 3,120,394
Patented Feb. 4, 1964

3,120,394
JOINT SEAL FOR SPLIT PACKING
Harold W. Gould, Evanston, Ill., assignor to Crane Packing Company, Morton Grove, Ill., a corporation of Illinois
Filed Sept. 11, 1961, Ser. No. 137,346
4 Claims. (Cl. 277—124)

This invention relates to packing of the multiple, split-ring type.

A form of packing frequently used for sealing pump rods and cylinders for presses or the like comprises a plurality of split rings which have a V-type cross section with one ring nested into the other and profiled to exert a spreading force upon the ends of the said other ring. An annular space still remains, however, between the apex of one ring and the interior of said other ring. The rings are split to make possible the replacement of the rings in hydraulic equipment without disassembling such equipment. The location of one split is made to occur 180° away from the split in the adjacent ring to make difficult the passage of the sealed fluid through the packing. This arrangement is not completely successful, since the leakage through the first split may find its way into the annular space between adjacent rings and then circle around in such space to and through the next split to the second annular space, etc. until it ultimately finds its way past the split in the last ring. A leak then ensues through the packing which persists despite any tightening of the gland nuts which may be effected within normal limits.

A solution which has been proposed for the foregoing unsatisfactory operation is that of molding into the concave side of said split ring a series of dams which are contacted by the apex of the adjacent nested ring to form a barrier to the fluid which tends to pass through the adjacent annular space. Although the dam is effective to stop flow through the packing, it is necessary to mold and stock the dam type of packing in addition to the plain type packing which still has utility in certain situations.

It is an object of this invention to provide a means for blocking flow of fluid through nested, split V-rings of packing made from standard-section stock, uninterrupted by dams molded into the packing.

As a more specific object, this invention seeks to provide an insert of molded form to be used between the ends of a split packing ring of the V-type for the purpose of interposing a barrier to the circumferential flow of fluid between adjacent split rings.

These and other objects of this invention will become apparent from the following detailed description of a preferred embodiment thereof when taken together with the accompanying drawings in which:

FIG. 1 is a section through a packing gland in which are installed split rings of the type to which this invention is adapted to apply;

FIG. 2 is a perspective view of a short section of the packing of FIG. 1;

FIG. 3 is an end elevational view of the device of this invention used to block flow of leakage fluid around the packing, the view being sectioned along line 3—3 of FIG. 4;

FIG. 4 is a side elevational view of the device of FIG. 3;

FIG. 5 is an end elevational view of the device of FIG. 3 taken along line 5—5 of FIG. 6, showing how it cooperates with adjacent rings of packing to block flow therearound; and FIG. 6 is a side elevational view in section of adjacent fragments of packing showing the device of FIG. 3 installed therein, the section being taken along line 6—6 of FIG. 5.

The objects of this invention are achieved by the use of a molded, flexible, resilient insert, preferably made of an elastomer, which is placed between the ends of a split ring, the insert having a shape which when compressed by the adjacent packing, forms a complete barrier to flow of fluid circumferentially of the packing. Laterally extending tangs are molded as integral parts of the insert, and are of such cross section as to fit into the groove of the adjacent ends of a split ring. The tangs serve to hold and locate the insert relative to the ends of the ring.

Referring now to the drawings, the problem to be solved is illustrated in FIG. 1 in which is shown a fragment of the housing 10 of a hydraulic cylinder or the like, having an opening 11 therein through which extends a reciprocable rod 12.

Opening 11 is enlarged at 13 to form a stuffing box which is closed by a gland plate 14 through which extend studs 15, threaded at one end into housing 10, and on which are threadedly received gland nuts 16.

Within the stuffing box 13 are disposed packing rings 17, 18 and 19, each ring being substantially V-shaped in radial cross-section. Each ring is provided with a groove 20 opposite the apex 21 of the V cross-section, said groove serving to reduce the cross-section of the packing at the apex. The rings are arranged to nest into one another and in this manner, diverging movement of the ends of the V is effected when the assembled packing rings are compressed in an axial direction. Said ends are shaped to form thin lips 22, 23 which face the pressure of the fluid within the housing 10 and contact, respectively, the recess 13 and the rod 12 to form a seal therebetween. A male ring 24 and a female ring 25 are disposed against the ends of the nested packing rings, the male ring cooperating with the concave side of the lower ring to transmit axial thrust therebetween. Said end rings 24 and 25 have radially disposed outer surfaces 26 and 27, respectively, the radial surface 26 of end ring 24 abutting upon the bottom of the stuffing box 13, and the radial surface 27 on end ring 25 abutting against the gland plate 14. The pressure produced by the gland nuts 16 when they are tightened upon their respective studs 15 is transmitted through the gland plate 14 to the end ring 25 and then through the individual rings of packing 17, 18 and 19 to the end ring 24. The cross section of each of the rings 17, 18 and 19 is such as to tend to spread the V as the pressure increases, and thereby to produce a seal of increasing effectiveness between the rod and stuffing box 13.

Each packing ring 17, 18 and 19 is split as shown at 28 and 29, the split being made at an angle to the axis so that axial pressure upon the split and overlapping ends will assist in closing the gap between the ends of the packing. The purpose of the split is to make possible the removal of worn packing and the replacement thereof with new packing without disassembling the associated pump or cylinder. To avoid the possibility of a direct leak across the split, the split of one ring is disposed 180° away from the split of the ring adjacent thereto.

End rings 24 and 25 are not relied upon to effect a seal between the rod and stuffing box, and hence it is quite possible that fluid may leak along the rod 12 past end ring 24 to the first packing ring 17. There the fluid may enter the split 28, pass through and then enter the groove of the next packing ring 18, where it will circle around the packing until it finds the split in said ring 18. There it will pass through and enter the groove of the next packing ring 19, and after passing around in said groove to the split 29 will pass through said split, and then out past end ring 25 to the exterior of the housing. It is to the solution of this problem that the present invention is addressed.

According to the present invention, leakage through the split in a ring and along the groove formed therein is prevented by the use of an insert adapted to be placed between the ends of a split packing ring, said insert being contoured to fill the space between the rings located to either side of the said one ring. The insert is made of resilient deformable material which is compressible to effect a seal between the ends of said one ring as well as to effect a barrier between the rings located to either side of said one ring. Thus, as shown in FIGS. 3, 4 and 5, the insert is comprised of an individual piece of elastomeric material 30 having substantially parallel faces 31, 32 and is adapted to be placed between the ends of a split packing ring in such manner that said ends abut faces 31 and 32. It has substantially parallel sides 33, 34 which for ease of molding may be made flat, although since the sides are adapted to cooperate with the cylindrical surfaces of the rod 12 and stuffing box 13, they should theoretically and ideally be segments of cylindrical surfaces. Inasmuch as the material of the insert is an elastomer which is resilient and deformable, such surfaces 33 and 34, even though molded flat, will readily deform the slight amount required to conform to the mating cylindrical surfaces of the rod and stuffing box.

The top and bottom edges 35 and 36 of the insert may be made to have the same concave and convex contours as the concave and convex sides 39 and 37, respectively (FIG. 2), of the packing of which the rings 17, 18 and 19 are made. Here again, ideally, the edge 36, which is intended to fit into the adjacent packing, should be made to conform thereto, but inasmuch as each insert extends completely across a groove formed between adjacent packing rings and thus provides a complete barrier to circumferential movement of fluid in said groove, it is immaterial whether or not the convex portion thereof also fits exactly the groove of the adjacent packing, since any leak past one insert will be blocked by the insert in the adjacent packing. It may be remembered that since the packing is deformed by the pressure of the gland plate 14, its exact contour under pressure will vary, and therefore no exact contour for the top and bottom edges 35 and 36 can be predetermined.

To assist in holding the insert 30 in place when the packing rings are assembled around a rod, said insert is formed with integral and aligned tabs 40 and 41 extending outwardly from the parallel faces 31 and 32, respectively, of the insert. Said tabs, as shown in FIG. 3, have a contour in cross section on one side which approximates the contour of the groove 20 in a packing ring except that the tabs are slightly larger in cross section to provide a snug fit between the tab and packing and thereby cause the tabs to be held frictionally in place during the assembly operation.

When the insert is installed in the packing ring, and the packing ring is placed in the stuffing box, but is not yet compressed, the insert will take the form shown in FIG. 5. It may be observed from the dotted outlines of the packing that the insert extends completely across the groove 20, and also across the adjacent ends of the split in the packing, so that a complete seal is effected, not only between the split ends of the packing, but across the groove as well. Leakage of fluid across the split and along the groove is thus effectively eliminated.

In addition to providing a barrier across the groove of a packing, the insert 30 also provides a barrier across the spaces 44, 45, 46 and 47 between the lips of one ring and the convex side of the adjacent ring In this manner, all possible leakage paths between adjacent packing rings are blocked.

Although theoretically one insert 30 would be sufficient to break up the leakage path through the rings in a stuffing box, it is difficult to determine precisely where the leakage occurs, and it is quite possible that one ring may leak across its inner surface 42 or its outer surface 43, even though leakage along its groove or across its split ends may be blocked by an insert Accordingly, it is desirable to use an insert 30 with each ring. This also makes possible uniform circumferential dimensions on each of the rings in a set used in a given stuffing box. It may be observed that insert 30 has an appreciable thickness which must be compensated for in the ring by making the ring circumference smaller, thus producing a greater spacing between the ends thereof. Thus, if only one ring were to be provided with an insert, its dimensions, particularly as to the gap across its ends, would be different from those of the rings not supplied with an insert.

It is understood that the effectiveness of the insert 30 is not limited to its use with rings having the precise contour illustrated in the accompanying drawings, but the insert may be used with any ring having a V-shape wherein the opposite surfaces of a ring in an axial direction are not identically contoured. The scope of this invention, therefore, is not limited to the illustrative samples described above, but is determined by the appended claims.

I claim:

1. In combination in a stuffing box, adjacent split rings of packing, each ring having a V-shaped radial cross section, presenting a concave side and a convex side, with the convex side of one ring nested within the concave side of the adjacent ring, the convex side of each ring being differently contoured from the concave side thereof and thus forming continuous circumferential voids between adjacent rings of packing, and an insert disposed between the ends of one of said split rings, said insert comprising a substantially flat piece of material having a contour corresponding to the contour of a space slightly larger than the space defined in a stuffing box by two rings of packing separated by a third ring of packing, said insert being pressed against said two rings, whereby to provide a barrier against passage of fluid circumferentially of the rings through said voids 2. The combination described in claim 1, said insert being resilient and compressible, whereby to conform to the contours of the packing adjacent thereto.

3. The combination described in claim 1, said insert having a tab extending outwardly therefrom and into a void, said tab contacting the concave side of said one of said rings and thereby serving to locate the insert relative to said one ring.

4. The combination described in claim 1, said insert having aligned tabs extending outwardly from opposite sides thereof and into a void on each side of the split, said tabs contacting the concave side of said one of said rings and thereby serving to locate the insert relative to said one ring.

References Cited in the file of this patent

UNITED STATES PATENTS

| | | |
|---|---|---|
| 2,264,147 | Dunlevy | Nov. 25, 1941 |
| 2,665,151 | Fisler et al. | Jan. 5, 1954 |
| 2,738,243 | Sawyer | Mar. 13, 1956 |